(12) United States Patent
Stetter et al.

(10) Patent No.: US 9,359,790 B2
(45) Date of Patent: Jun. 7, 2016

(54) ELECTRONIC KEY FOR A VEHICLE

(71) Applicant: Continental Automotive GmbH, Hannover (DE)

(72) Inventors: Ulrich Stetter, Regensburg (DE); Rolf Friedrich, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/409,686

(22) PCT Filed: Jun. 19, 2013

(86) PCT No.: PCT/EP2013/062785
§ 371 (c)(1),
(2) Date: Dec. 19, 2014

(87) PCT Pub. No.: WO2013/190004
PCT Pub. Date: Dec. 27, 2013

(65) Prior Publication Data
US 2015/0191933 A1    Jul. 9, 2015

(30) Foreign Application Priority Data
Jun. 20, 2012   (DE) .......................... 10 2012 210 357

(51) Int. Cl.
*E05B 19/00*   (2006.01)
*B29C 45/56*   (2006.01)
(Continued)

(52) U.S. Cl.
CPC ........... *E05B 19/0088* (2013.01); *B29C 45/561* (2013.01); *B29D 99/006* (2013.01);
(Continued)

(58) Field of Classification Search
CPC   E05B 19/0088; B29D 99/006; B29C 45/561; B29C 2045/5635; G07C 9/00944; H01H 9/0235; H01H 2009/183
See application file for complete search history.

(56) References Cited

U.S. PATENT DOCUMENTS

| | | | |
|---|---|---|---|
| 6,980,095 B2 | 12/2005 | Wright et al. | 340/426.36 |
| 7,073,916 B2 | 7/2006 | Yin et al. | 362/84 |

(Continued)

FOREIGN PATENT DOCUMENTS

| | | | | |
|---|---|---|---|---|
| CH | 698545 B1 | 8/2009 | | B60R 25/20 |
| DE | 102008062579 B3 | 12/2009 | | G06F 13/04 |

(Continued)

OTHER PUBLICATIONS

International Search Report and Written Opinion, Application No. PCT/EP2013/062785, 15 pages, Sep. 26, 2013.

*Primary Examiner* — Thomas M Sember
(74) *Attorney, Agent, or Firm* — Slayden Grubert Beard PLLC

(57) ABSTRACT

An electronic key, e.g., a wireless key for a vehicle, is disclosed. The key has a housing with a housing wall having a semi-transparent display section. An information symbol for representing information to be displayed to a user is further provided. The display section has a housing wall section with reduced wall thickness, wherein a light-impermeable layer, in which recesses representing the information symbol are produced, is applied to an inner side of the housing. The combination of a housing wall section of reduced thickness and the light-impermeable layer on the inner side of the housing as an information symbol provided in the display section creates an information symbol that may be very sharp and bright when backlit and, due to the semitransparent formation of the display section, is not visible when not backlit.

15 Claims, 2 Drawing Sheets

(51) Int. Cl.
  *G07C 9/00* (2006.01)
  *B29D 99/00* (2010.01)
  *H01H 9/02* (2006.01)
  *H01H 9/18* (2006.01)

(52) U.S. Cl.
  CPC ..... *G07C9/00944* (2013.01); *B29C 2045/5635* (2013.01); *H01H 9/0235* (2013.01); *H01H 2009/183* (2013.01); *Y10T 70/7051* (2015.04)

(56) References Cited

U.S. PATENT DOCUMENTS 7,884,315 B2 * 2/2011 Andre ................. G06F 9/30
                                              250/227.26

2005/0236740 A1 10/2005 Niewels ................. 264/328.7
2009/0286072 A1 11/2009 Küchler et al. ............. 428/336
2011/0266123 A1 11/2011 Jeitner ..................... 200/312

FOREIGN PATENT DOCUMENTS

| | | | |
|---|---|---|---|
| DE | 102009022667 A1 | 12/2010 | ............ E05B 19/00 |
| JP | 01184114 A | 7/1989 | |
| JP | 2003317570 A | 11/2003 | |
| JP | 2005347193 A | 12/2005 | |
| JP | 2006092898 A | 4/2006 | |
| JP | 2009052338 A | 3/2009 | |
| WO | 2008/061786 A1 | 5/2008 | ............ B60Q 3/04 |
| WO | 2013/190004 A1 | 12/2013 | ............ B29C 49/56 |

* cited by examiner

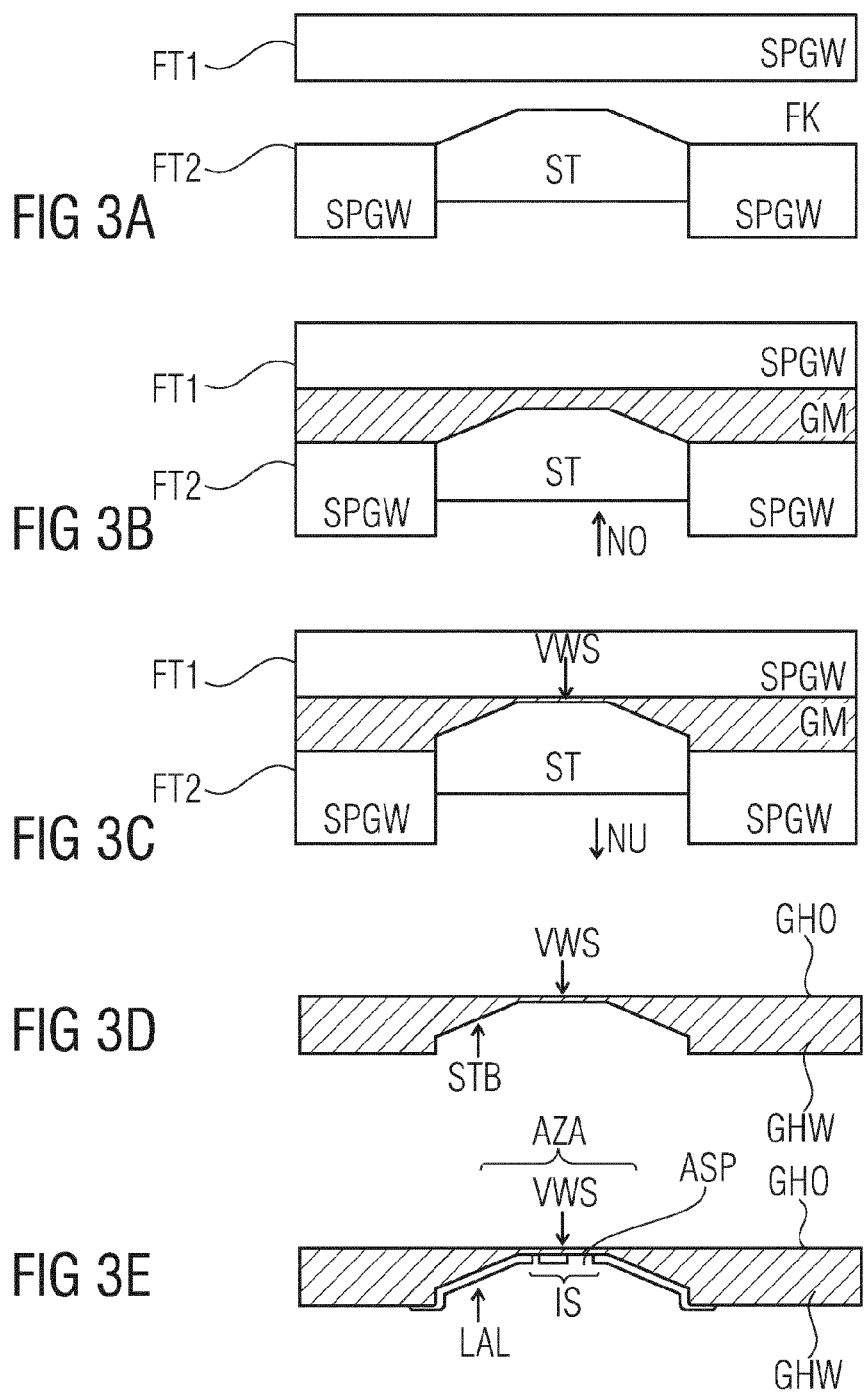

ELECTRONIC KEY FOR A VEHICLE

CROSS-REFERENCE TO RELATED APPLICATIONS

This application is a U.S. National Stage Application of International Application No. PCT/EP2013/062785 filed Jun. 19, 2013, which designates the United States of America, and claims priority to DE Application No. 10 2012 210 357.0 filed Jun. 20, 2012, the contents of which are hereby incorporated by reference in their entirety.

TECHNICAL FIELD

The following invention relates to an electronic key for a vehicle, in particular a radio-controlled key, and to a method for producing a housing for an electronic key.

BACKGROUND

A large number of vehicle functions can be controlled or initiated remotely by means of today's modern electronic keys for vehicles, in particular in an embodiment as radio-controlled keys. In addition to the generally known safety functions for locking and unlocking one or more vehicle doors, in which the electronic key is used as the user part of an access system to the vehicle, in the meantime there is a large number of further functions which can be controlled remotely. For this reason, electronic keys for vehicles can by now also be referred to as remote control keys for vehicles.

In order firstly to identify the correct button on the key for initiating a desired vehicle function, it is possible to apply function symbols for a button function on the housing of the electronic key or directly on a button. Secondly, for example in the case of electronic keys which enable bidirectional communication with the vehicle, information relating to the vehicle (for example the current locking state of the vehicle doors) can also be displayed on the key. Correspondingly, depending on the information content to be represented, information symbols for a user can be displayed on the electronic key.

In particular such function symbols which are applied to the housing or the buttons are subject to environmental influences without any protection, with the result that abrasion and aging can cause the function symbols to wear and the functions of the electronic key can no longer be clearly assigned by the user.

SUMMARY

One embodiment provides an electronic key for a vehicle, comprising a housing having a housing wall that includes a semitransparent display section, an information symbol that represents an item of information to be displayed to a user, wherein the display section has a housing wall section with a reduced wall thickness, and an opaque layer applied to an inner side of the housing wall section with the reduced wall thickness, said opaque layer including cutouts that at least partially define the information symbol.

In a further embodiment, the layer has a light-absorbing paint.

In a further embodiment, the electronic key further comprises a lighting source arranged on the inner side of the housing wall section with the reduced wall thickness, wherein the lighting source is configured to illuminate said housing inner side.

In a further embodiment, the electronic key further comprises a switching element configured to initiate a key function, and a switching cap in the housing and configured for actuation by a user, wherein the switching cap is mechanically connected to the switching element for actuation of the switching element via user actuation of the switching cap, wherein the display section is provided in the switching cap.

In a further embodiment, the semitransparent display section is formed by a semitransparent material, e.g., semitransparent plastic, of the housing wall in a region of the display section.

In a further embodiment, the electronic key further comprises a semitransparent layer applied to an outer side of the housing wall in a region of the display section.

In a further embodiment, an outer side of the housing wall is homogeneous in a region of the display section.

Another embodiment provides a method for producing a housing for an electronic key for a vehicle, said method comprising providing an injection mold having a molding space configured to produce a housing having a housing wall section with a reduced wall thickness, injecting a molding compound into the molding space, and applying an opaque layer to the housing wall section with the reduced wall thickness, said opaque layer including cutouts that at least partially define an information symbol that represents an item of information to be displayed to a user.

In a further embodiment, forming the housing wall section with the reduced wall thickness comprises moving a movable slide of the injection mold into the molding space once a molding compound has been injected into the molding space in a plastically deformable state of the molding compound.

In a further embodiment, the method comprises applying the opaque layer continuously to the housing wall section with the reduced wall thickness on a side on which the slide has been pressed in, and removing the opaque layer in a region of the housing wall section with the reduced wall thickness such that cutouts produced in the process represent the information symbol.

In a further embodiment, the removal of the light-absorbing layer is performed by a laser or by a mechanical device.

In a further embodiment, the application of the opaque layer with a cut-out information symbol is performed by a printing process, e.g., a pad printing process.

In a further embodiment, the application of the opaque layer with a cut-out information symbol is performed a photochemical process.

BRIEF DESCRIPTION OF THE DRAWINGS

Example embodiment of the present invention are explained in more detail below with reference to the attached drawings, in which:

FIGS. 3a-3e shows, schematically, a method for producing a housing for an electronic key for a vehicle.

DETAILED DESCRIPTION

Figure 1:
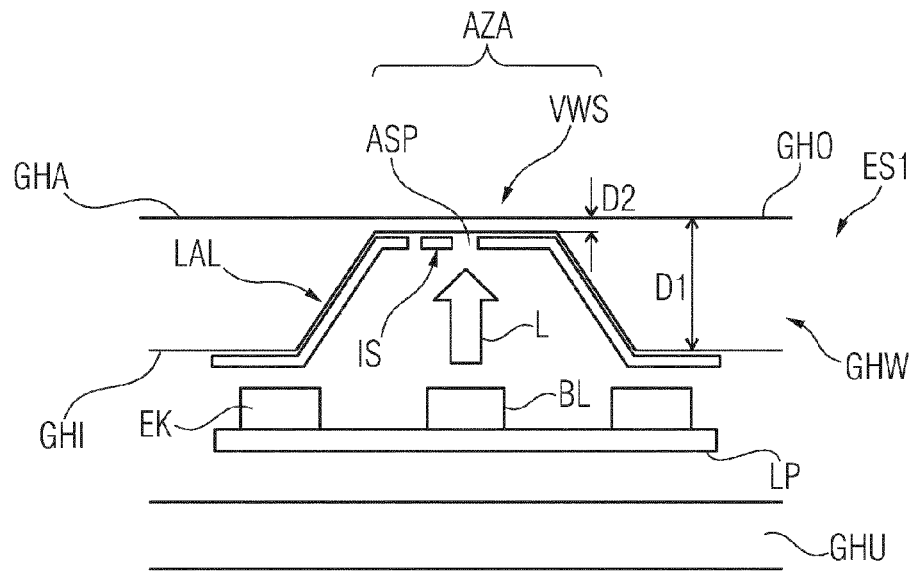
FIG. 1 shows a schematic cross section through an electronic key in the region of a display section in accordance with a first embodiment.

Embodiments of the present invention provide an electronic key for a vehicle in which function symbols or general information symbols with a long life are easily identifiable for a user.

Some embodiments provide an electronic key, e.g., a radio-controlled key, for a vehicle, which comprises a housing having a housing wall, which has a semitransparent display section. The housing is used in particular for accommodating or protecting electronic components. Furthermore, the electronic key comprises an information symbol for representing an item of information to be displayed to a user. In this case, the display section has a housing wall section with a reduced wall thickness. In particular, the wall thickness of the housing wall section with a reduced wall thickness is reduced in comparison with the housing wall surrounding it. The housing wall is (with a normal wall thickness) intended to provide protection against the action of forces from the outside and to provide improved levels of light transmission in the function of a window in the region of the display section, to be more precise on the housing wall section with a reduced wall thickness. In addition, an opaque layer is applied on an inner side or housing inner side of the housing wall section with a reduced wall thickness, with cutouts being introduced into said opaque layer and representing the information symbol. In this case, the opaque layer can be a light-absorbing layer or a light-reflecting layer. By means of such an electronic key, in which the opaque layer with an incorporated information symbol is applied to the housing inner side, it is firstly possible to ensure that the information symbol is not subjected to any environmental influences and remains easily visible for a long period of time. Furthermore, by using the opaque layer into which the information symbol is incorporated, a clear representation of the information symbol can be achieved. Finally, yet a further advantage consists in that a semitransparent display section is provided in the housing, as a result of which, firstly, the inner structure of the housing, in particular the display section, is not visible, and therefore the information symbol is also not clearly identifiable to a user from the outside if there is no backlighting from the housing inner side.

In one embodiment, the opaque layer comprises a light-absorbing paint. This can be applied in a simple manner specifically in the region of the display section or over a larger area on the housing inner side. Owing to the semitransparent design of the display section, the internal structure of the housing, as mentioned above, cannot be seen, with the result that it is not necessary for stringent requirements to be placed on the precise application of the paint to the housing inner side.

In another embodiment, said electronic key furthermore has a lighting source, which is arranged on the housing inner side of the housing wall section with a reduced wall thickness, in particular adjacent thereto or assigned thereto for illuminating said housing wall section or for illuminating the information symbol. Therefore, in accordance with this configuration, it is possible to provide an electronic key in which, by virtue of the fact that the opaque layer is interrupted in the display section (in accordance with the contours of the information symbol), a sharply bordered information symbol is identifiable on backlighting. The lighting source can in particular be in the form of a controllable lighting source, for example in the form of an LED (light-emitting diode). Advantageously, the lighting source can be switched on and off by means of a control device, such as a microcontroller, of the electronic key, with the result that the information symbol can be illuminated from the housing inner side at a given time and is therefore then visible to a user from outside of the housing. In this way, the information symbol can be used to assign a specific function to a button provided on the electronic key at a certain time or during a predetermined time interval. It is also conceivable for the information symbol to be useable for communicating a certain item of information (independently of the button function) to the user. This may be, for example, an item of information relating to a (current) key state, such as, for example, an excessively low state of charge of the battery, but may also be an item of information which the electronic key has received from the vehicle assigned to it, such as, for example, the locking state of the vehicle doors of the associated vehicle. Finally, it is also conceivable for two or more display sections with different information symbols to be provided in a housing or a housing wall. In this case, for example, different information symbols can be assigned to a certain button, wherein the actuation of the button initiates a different command in the key depending on which information symbol is active or backlit at that time.

In another embodiment, said electronic key furthermore has a switching element, which is arranged in particular in the housing interior and is electrically connected to corresponding key electronics, and has a button or switching cap as part of the housing of the electronic key for actuation by a user. The switching cap is in this case in mechanical interaction with or mechanically connected to the switching element for actuation thereof, wherein the display section is provided in the switching cap. This means that, in this embodiment, the display section with the information symbol is provided specifically in the switching cap in order to clearly identify a function of the switching element or of the switching cap or to represent an item of information which bears relation to the switching cap. If, for example, the function of locking of all of the vehicle doors is assigned to a specific switching element or a switching cap, the information symbol can display a locking state, for example, which would be sent back by the key from the assigned vehicle in response to a locking request.

In another embodiment, the semitransparent display section is formed by virtue of the fact that it has a semitransparent material of the housing wall in the region of the display section. For example, the entire housing, part of the housing (for example a housing shell which forms the housing in particular with one or more further housing shells) or the housing only in the region of the display section can consist of a semitransparent material. In this case, plastic, in particular a semitransparent plastic, can be used as material for the housing, for example. Thus, an inexpensive housing can be provided for the electronic key.

In another embodiment, the semitransparent display section can also be achieved by virtue of the fact that a semitransparent coating is applied to an outer side of the housing, primarily in the region of the display section. In this case, the housing can then likewise be produced from a semitransparent material in the region of the display section or else from a transparent material since, owing to the semitransparent coating, the inner structure of the housing and therefore the information symbol are not visible from the outside.

In another embodiment, the housing wall is homogeneous or uninterrupted on the outer side of the region of the display section, i.e. it does not have a contour on the outer side (such as that of the information symbol). In this case, the surface on the outer side can be formed so as to be smooth in the region of the display section or can have a roughened portion in order to conceal in homogeneities or fingerprints.

Other embodiments provide a method for producing a housing for an electronic key. In this case, the method comprises the following steps. First, an injection mold with a molding space or a mold chamber for the housing to be produced is provided, by means of which a housing wall section with a reduced wall thickness can be formed. In this case, a constriction can be provided fixedly (or statically) in the injection mold in the molding space, or the molding space can be variable in terms of shape by virtue of a movable element, as is explained in more detail below, in order to produce the housing wall section with a reduced wall thickness. Then, a molding compound, for example a plastic compound, from which the housing to be produced is formed, is injected into the molding space. As a result, the form of the housing together with the housing wall section with a reduced wall thickness is produced. Then, in the cured state of the molding compound, an opaque layer is applied to the housing wall section with a reduced wall thickness, in particular to the inner side of the housing, with an information symbol for a user. By means of such a method, a housing for an electronic key with an information symbol can be provided in which the incorporated information symbol remains easily visible for a long period of time and in which a sharp representation of the information symbol can be ensured.

In one embodiment, the injection mold has a (movable) slide, which is movable into and out of the molding space. In this case, once the molding compound has been injected into the molding space in the still deformable state of the molding compound, the movable slide moves into the molding space in order to form the housing wall section with a reduced wall thickness. Then, in the cured state of the molding compound, an opaque layer is applied to the housing wall section with a reduced wall thickness, in particular to the side of the housing wall section on which the movable slide has been pressed in, with an information symbol for a user. With such a method for producing a housing including a housing wall section with a reduced wall thickness by means of (subsequently) inserting a movable slide for producing the housing wall section with a reduced wall thickness, the possibility of the housing wall section with a reduced wall thickness not being closed during the injection-molding process or visible flow lines disrupting the homogeneous impression of the surface is avoided.

In one embodiment, first the opaque layer can be applied (continuously) to the housing wall section with a reduced wall thickness on the side on which the movable slide has been pressed in. Then, the opaque layer is removed in the region of the housing wall section with a reduced wall thickness in such a way that the removal represents the information symbol for the user. In this way, a method which is simple in terms of apparatus for applying the information symbol is provided, in which the opaque layer is applied without any stringent requirements in respect of accuracy since the information symbol does not need to be formed until during the removal process step.

The opaque layer can in this case comprise a light-absorbing or light-reflecting layer. In particular, it can comprise a light-absorbing paint, which is applied to the housing wall section.

The abovementioned removal of the opaque layer (for example in the form of a light-absorbing paint) can be performed by means of a laser (laser ablation) or by mechanical means.

It is also conceivable to apply the opaque layer with a cut-out information symbol by means of a printing process, in particular a pad printing process. As an alternative to this, it is also possible to perform the application of the opaque layer with a cut-out information symbol by means of a photochemical process.

In the method for producing a housing, a semitransparent molding compound can be used as molding compound, for example, as a result of which inner structures of the housing are no longer visible from the outside in the finished housing part. It is also conceivable for a semitransparent coating to be applied in a subsequent step, after production of the housing, at least in the region of the housing wall section with a reduced wall thickness on the housing outer side or the opposite side of the housing wall, on which the slide has been pressed in, with the result that, in this case too, the inner structure of the housing or of the housing wall section with a reduced wall thickness and therefore the information symbol is not visible to a user when the housing is in use as long as the information symbol is not backlit.

Advantageous configurations of the electronic key, insofar as they are applicable to the method, can also be considered to be advantageous configurations of the method.

Reference is first made to FIG. 1, in which a first embodiment of an electronic key, in particular in the form of a radio-controlled key, for a vehicle in the region of a display section is shown. The electronic key ES1 in accordance with the first embodiment in this case comprises a housing consisting of an upper housing part GHO and a lower housing part GHU. While the lower housing part GHU in the figure is merely used for protecting components located in the housing, a display section AZA for displaying an information symbol IS is formed in the upper housing part GHO. In this display section AZA the housing wall GHW of the upper housing part GHO has a housing wall section VWS with a reduced wall thickness. This housing wall section VWS has, in contrast to the housing wall surrounding this section, a reduced wall thickness, wherein the wall thickness D2 of the housing wall section VWS is 0.3 mm, for example, and the surrounding housing wall can have a "normal" wall thickness D1 of 1.3 mm, for example. In the example shown in FIG. 1, the housing wall GHW is formed from a semitransparent material, such as from a semitransparent plastic, for example.

An opaque layer, for example in the form of a light-absorbing paint LAL, is applied to an inner side GHI of the housing wall GHW, in particular in the region of the display section AZA. The light-absorbing paint LAL is removed only in the region of the housing wall section VWS with a reduced wall thickness such that corresponding cutouts ASP in the paint form an information symbol IS or a pictogram.

A printed circuit board LP, on which a lighting source BL and further electrical or electronic components EK are provided on one side, is provided in the housing interior, i.e. on the housing inner side GHI. The lighting source, in particular in the form of an LED (light-emitting diode), is arranged here directly below or opposite the housing wall section VWS with a reduced wall thickness on the printed circuit board LP in order to backlight the information symbol IS by means of light L. In this case, the lighting source can be in the form of a controllable lighting source, which can be activated at an appropriate time by means of a microcontroller, for example, which can be included in the electronic components EK.

If the lighting source BL is not activated, the semitransparent material of the housing wall, in particular in the display section AZA, prevents a user from being able to identify the inner structure of the housing wall GHW from a housing outer side GHA. In other words, the housing outer side GHA has a homogeneous effect when the lighting source BL is not switched on and the information symbol IS is not visible. This improves the esthetic impression of the electronic key for a user.

If, on the other hand, the lighting source BL is switched on, the light L emerging from said lighting source is used to represent the information symbol such that it is clearly visible to a user on the housing outer side GHA by virtue of it passing or shining through the cutouts ASP in the paint LAL. Owing to the reduction in the wall section or wall cross section (quasi in the form of a window) in the region of the housing wall section VWS, the light L only needs to pass a short distance through the semitransparent housing material, with the result that the light intensity is barely reduced. Secondly, as will be explained in more detail later, the cutouts ASP can be formed with a high degree of precision and with a highly filigree nature so that, by virtue of the combination of the thin wall thickness with the layer of paint cut out as information symbol IS on the inner side GHI, there is very good readability on backlighting and filigree or sharp symbols or pictograms can be depicted on the housing outer side GHA during backlighting. In addition, by forming the symbols on the housing inner side, the life of these symbols is extended since they are not subject to any environmental influences (for example abrasion, contamination, chemically active substances) from the outside.

Figure 2:
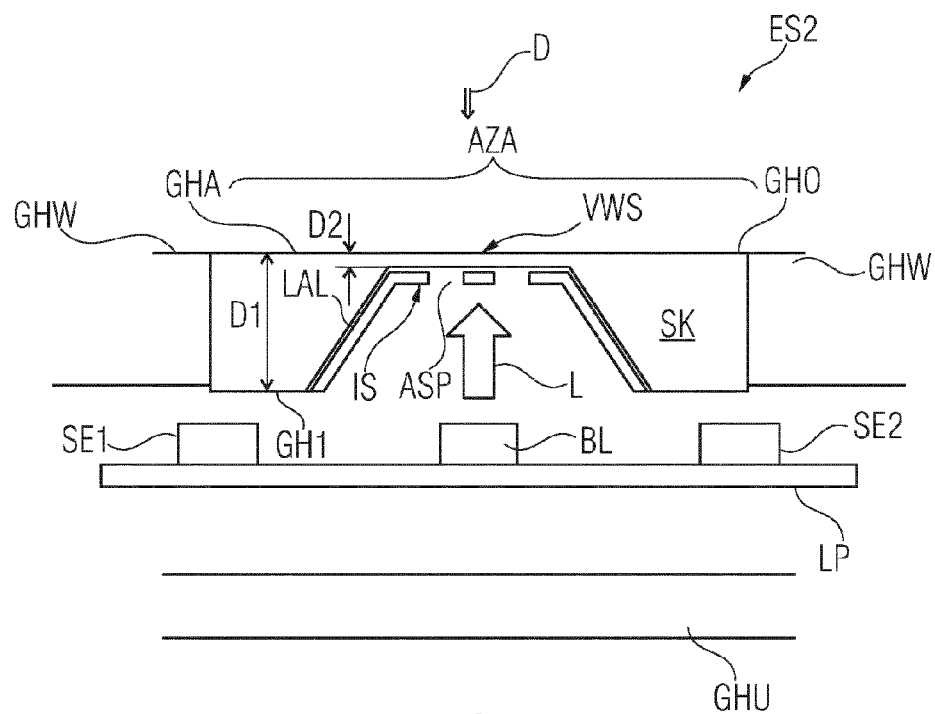
FIG. 2 shows a schematic cross section through an electronic key in the region of a display section, in this case in a button or switching cap in accordance with a second embodiment.

Reference is now made to FIG. 2, which shows a schematic cross-sectional illustration of an electronic key ES2 in a region of a display section AZA in accordance with a second embodiment. This second embodiment of an electronic key substantially corresponds to the first embodiment, wherein the difference consists in that the display section AZA in this case comprises a button or a switching cap SK of the electronic key ES2 for actuation by a user. As in the first embodiment, the electronic key ES2 has a housing consisting of an upper housing part GHO and a lower housing part GHU. A button or switching cap SK for actuation by a user is incorporated in a housing wall GHW of the upper housing part GHO. This switching cap SK at the same time provides the display section AZA, in this second embodiment. As in the first embodiment, the switching cap SK comprises a section with a "normal" thickness D1 and a section VWS with a reduced wall thickness and a thickness D2, which is less than the thickness D1. For example, in this case too, the thickness D1 can have a value of approximately 1.3 mm, and the thickness D2 can have a value of 0.3 mm. A light-absorbing paint LAL is applied to a housing inner side or switching cap inner side GHI in the region of the section VWS with a reduced wall thickness, which light-absorbing paint has cutouts for representing an information symbol IS in the region of the thinned or reduced wall thickness (in the center of the switching cap in the figure). As in the first embodiment of the electronic key ES1, a printed circuit board LP with a lighting source BL is arranged in the interior of the housing or on the side GHI, which printed circuit board is designed to backlight the information symbol (as in the first embodiment). The lighting source BL can in this case be drivable again by means of a control device or a microcontroller. Light L which is emitted by the lighting source is first retained by the light-absorbing paint LAL and can only pass though the cutouts representing the information symbol IS. Owing to the precise formation of the information symbol, therefore, the information symbol can be visible to a user with sharp definition and with a filigree nature on the opposite side GHA. In addition, owing to the fact that the wall thickness is very reduced or thinned in the section VWS, light can easily pass through this region of the switching cap SK (even when said switching cap is formed from a semitransparent material), with the result that bright and good visibility of the information symbol IS on the side GHA is ensured.

If a user presses the switching cap SK in the direction of the arrow D (downwards in the figure), the switching cap SK hits two switching elements SE1 and SE2, which are triggered thereby (however, it is conceivable for only one switching element which has a ring contact via which it can be triggered to be used instead of the use of two switching elements). By triggering the two switching elements, for example, a control device can be instructed to perform a specific function. For example, the control device on the key side can activate a transmission device such that it transmits a signal from the electronic key ES2 to the vehicle, in particular with an item of information in respect of locking of the vehicle doors. In accordance with a particular configuration, the key ES2 can have not only a transmission device but in addition also a reception device, which is capable of receiving an actuation signal from the vehicle, for example, which has information relating to the locking state (in the example of all doors locked). This information can then be displayed to a user by virtue of the lighting source BL being activated so that it backlights the information symbol IS which can have a closed padlock, for example. The user sees the symbol and knows that his desire to lock the vehicle has been performed.

Reference is now made to FIG. 3, in which the production of a housing for an electronic key in accordance with the first embodiment in FIG. 1, for example, is illustrated schematically. In this case, reference is first made to FIG. 3A, in which an injection mold SPGW is illustrated, which injection mold has a first or upper mold part FT1 and a second mold part or lower mold part FT2. Both mold parts can also be formed in one piece. The two mold parts FT1 and FT2 in this case form a mold chamber or a molding space FK in which an injection molding compound, in particular a plastic compound, can be injected. A die ST which is movable in the direction of the molding space FK (towards the top in the figure) is characteristic of the injection mold SPGW, as will be explained in more detail in the description below. Once the injection mold SPGW has been provided, in the next step a molding compound GM is injected into the molding space FK.

FIG. 3B now again shows the injection mold SPGW from FIG. 3A, wherein in this case the molding compound GM from which the housing of the electronic key is formed has already been injected into the molding space FK. The die ST is now moved from the starting position in the direction of the arrow NO (upwards in the figure) in the direction of the molding space FK.

FIG. 3C now shows the injection mold SPGW in a state in which the die ST is in its final state of the molding process, wherein a section with a reduced wall thickness VWS (quasi in the form of a window) is depicted between its upper section and the upper mold part FT1. After curing of the molding compound GM, the die is then moved in the direction of the arrow NU (downwards in the figure), i.e. moved back into the initial position, and the mold parts FT1 and FT2 are drawn apart from one another in order to release the housing part.

Once the injection mold SPGW has been separated, a housing or, in comparison to FIG. 1, an upper housing part GHO now remains over, which housing part has a housing wall GHW which comprises a housing wall section VWS with a reduced wall thickness, as is shown in FIG. 3D. Since the upper housing part GHO with a section VWS with a reduced wall thickness is now provided for a display section, it is necessary in the following steps to provide or introduce an information symbol as well.

For this purpose, reference is made to FIG. 3E, in which a light-absorbing paint LAL is now applied in a region STB in which the movable die ST was pressed in (i.e. on an inner side of the housing part GHO) during the production process of the housing part GHO. In a subsequent step, the paint LAL is removed in the region of the housing wall section VWS with a reduced wall thickness at certain points so that cutouts ASP are produced, which ultimately form the information symbol IS. This removal of the paint LAL can be performed by means of laser ablation or by mechanical means, for example. In the case of backlighting of the information symbol IS, i.e. by means of a light source (which emits light from the bottom upwards in the figure), a sharp or filigree and bright information symbol can be seen on the upper side (or outer side) of the upper housing part GHO. If the light source is switched off, the inner structure of the display section AZA is not visible owing to the semitransparent formation of the housing upper part GHO. A further advantage of the method just illustrated consists in that, by virtue of the use of the moveable slide ST while the molding compound GM is injected into the injection mold SPGW, the slide ST is still drawn back (at the bottom in the figure) until the mold is filled, and then the slide is pushed forwards into the still plastically deformable compound in order to achieve the intended wall thickness (reduced wall thickness). This avoids the possibility of the housing wall section with a reduced wall thickness (also referred to as window region) possibly not being closed or visible flow lines disrupting the homogeneous impression on the surface. The proposed method also does not represent any restriction in respect of the configuration of the information symbol (or pictogram) as regards the line width and closed lines. This is an advantage over the possibility of applying a paint through a fine blanking mask, whose filigree structure needs to be stabilized by means of clips which could in turn mask the application of paint.

As already mentioned above, an electronic key or vehicle key in accordance with the embodiments in FIGS. 1 and 2 can be used as a mobile part of a wireless access system for a vehicle. With the aid of the electronic key which is carried along in the hand or a pocket of a person with access authorization, for example, as soon as the person approaches the vehicle a radio link is set up when the electronic key is activated, and this radio link automatically opens the vehicle and additionally adjusts the wing mirrors and/or the rear view mirror and the driver's seat for the person with access authorization, for example. In order to set up the radio link, the electronic key has a transceiver device in its electronic components EK (cf. FIG. 1 in this regard), by means of which transceiver device request signals can be received by the vehicle and corresponding response signals which contain a code for the key can be sent back to the vehicle.

In order to implement the access system, the vehicle has a control unit comprising a microprocessor, which instructs the abovementioned settings and adjustments once the code transmitted by the electronic key has been identified as being valid. Such an access system in which the user of the electronic key does not need to actively actuate a button on the key in order to implement an authentification is also referred to as a passive access system.

Although the present invention has been described in particular with reference to an electronic key for a vehicle with reference to safety-relevant functions, it is further conceivable for the invention to be applied to other functions in which merely comfort functions are controllable by means of the key, such as, for example, the remote control of auxiliary heating or airconditioning, etc. It is also conceivable for certain vehicle states or warning messages of the vehicle to be displayed by means of information symbols on the key, such as, for example, a critical fuel level, a critical tire pressure, a theft alarm, etc.

What is claimed is:

1. An electronic key for a vehicle, comprising:
a housing having a housing wall that includes a semitransparent display section;
an information symbol that represents an item of information to be displayed to a user;
wherein the display section has a housing wall section with a reduced wall thickness; and
an opaque layer applied to an inner side of the housing wall section with the reduced wall thickness, said opaque layer including cutouts that at least partially define the information symbol.

2. The electronic key of claim 1, wherein the layer has a light-absorbing paint.

3. The electronic key of claim 1, further comprising a lighting source arranged on the inner side of the housing wall section with the reduced wall thickness, wherein the lighting source is configured to illuminate said housing inner side.

4. The electronic key of claim 1, further comprising:
a switching element configured to initiate a key function, and
a switching cap in the housing and configured for actuation by a user, wherein the switching cap is mechanically connected to the switching element for actuation of the switching element via user actuation of the switching cap,
wherein the display section is provided in the switching cap.

5. The electronic key of claim 1, wherein the semitransparent display section is formed by a semitransparent material of the housing wall in a region of the display section.

6. The electronic key of claim 5, wherein the semitransparent material is a semitransparent plastic.

7. The electronic key of claim 1, comprising a semitransparent layer applied to an outer side of the housing wall in a region of the display section.

8. The electronic key of claim 1, wherein an outer side of the housing wall is homogeneous in a region of the display section.

9. A method for producing a housing for an electronic key for a vehicle, said method comprising:
providing an injection mold having a molding space configured to form a housing having a housing wall section with a reduced wall thickness;
injecting a molding compound into the molding space; and
applying an opaque layer to the housing wall section with the reduced wall thickness, said opaque layer including cutouts that at least partially define an information symbol that represents an item of information to be displayed to a user,
wherein forming the housing wall section with the reduced wall thickness comprises moving a movable slide of the injection mold into the molding space once a molding compound has been injected into the molding space in a plastically deformable state of the molding compound.

10. The method as claimed in claim 9, comprising:
applying the opaque layer continuously to the housing wall section with the reduced wall thickness on a side on which the slide has been pressed in, and
removing the opaque layer in a region of the housing wall section with the reduced wall thickness such that cutouts produced in the process represent the information symbol.

11. The method of claim 10, wherein the removal of the light-absorbing layer is performed by a laser or by a mechanical device.

12. The method of claim 9, wherein the application of the opaque layer with a cut-out information symbol is performed by a printing process.

13. The method of claim 12, wherein the printing process is a pad printing process.

14. The method of claim 9, wherein the application of the opaque layer with a cut-out information symbol is performed a photochemical process.

15. An electronic key for a vehicle, comprising:
a housing having a housing wall that includes a semitransparent display section;
an information symbol that represents an item of information to be displayed to a user;
the display section having a housing wall section with a reduced wall thickness;
an opaque layer applied to an inner side of the housing wall section with the reduced wall thickness, said opaque layer including cutouts that at least partially define the information symbol;
a lighting source arranged on the inner side of the housing wall section with the reduced wall thickness, the lighting source configured to illuminate said housing inner side;
a switching element configured to initiate a key function;
a switching cap in the housing and configured for actuation by a user, wherein the switching cap is mechanically connected to the switching element for actuation of the switching element via user actuation of the switching cap.

* * * * *